United States Patent
Warren, Jr. et al.

(10) Patent No.: US 9,867,469 B2
(45) Date of Patent: Jan. 16, 2018

(54) SEATING DEVICE WITH COLLAPSIBLE ARMS

(71) Applicant: Durfold Corporation, Jackson, MS (US)

(72) Inventors: Jim H. Warren, Jr., Brandon, MS (US); Thomas J. Gilbert, Jr., Ridgeland, MS (US)

(73) Assignee: DURFOLD CORPORATION, Jackson, MS (US)

( * ) Notice: Subject to any disclaimer, the term of this patent is extended or adjusted under 35 U.S.C. 154(b) by 308 days.

(21) Appl. No.: 14/529,633

(22) Filed: Oct. 31, 2014

(65) Prior Publication Data

US 2015/0123447 A1    May 7, 2015

Related U.S. Application Data

(60) Provisional application No. 61/898,702, filed on Nov. 1, 2013.

(51) Int. Cl.

| | |
|---|---|
| *A61G 5/12* | (2006.01) |
| *A47C 7/54* | (2006.01) |
| *A61G 7/05* | (2006.01) |
| *B60N 2/30* | (2006.01) |
| *A47C 17/12* | (2006.01) |
| *A47C 1/03* | (2006.01) |

(52) U.S. Cl.
CPC .............. *A47C 7/543* (2013.01); *A61G 7/051* (2016.11); *A47C 1/03* (2013.01); *A47C 17/12* (2013.01); *A61G 5/12* (2013.01); *B60N 2/3018* (2013.01)

(58) Field of Classification Search
CPC ........ A47C 17/12; A47C 1/03; B60N 2/3018; A61G 5/12
USPC ............... 297/411.3–411.33, 411.35–411.37, 297/411.45, 115–117
See application file for complete search history.

(56) References Cited

U.S. PATENT DOCUMENTS

| 1,399,744 | A | * | 12/1921 | Brophy | ............... | B60N 2/4606 |
| | | | | | | 297/411.33 |
| 1,613,544 | A | * | 1/1927 | Tanner | .................. | A47C 17/12 |
| | | | | | | 297/116 |
| 3,140,119 | A | * | 7/1964 | Offner | ..................... | A61G 5/12 |
| | | | | | | 297/115 |
| 7,093,904 | B1 | * | 8/2006 | McMillen | ............. | A47C 7/543 |
| | | | | | | 297/411.32 |

FOREIGN PATENT DOCUMENTS

JP    58033532 A  *  2/1983

* cited by examiner

*Primary Examiner* — Syed A Islam
(74) *Attorney, Agent, or Firm* — Jason P. Mueller; Adams & Reese, LLP

(57) ABSTRACT

A seating device is provided have collapsible armrests. The collapsible armrests are attached to the seating device via brackets that hold the collapsible armest in a secure erect position while allowing the collapsible armrests to be rotated into a collapse position for access to the seating device. The armrests are externally attached on both side of the seating device and remain attached in both the erect and collapsed positions.

13 Claims, 7 Drawing Sheets

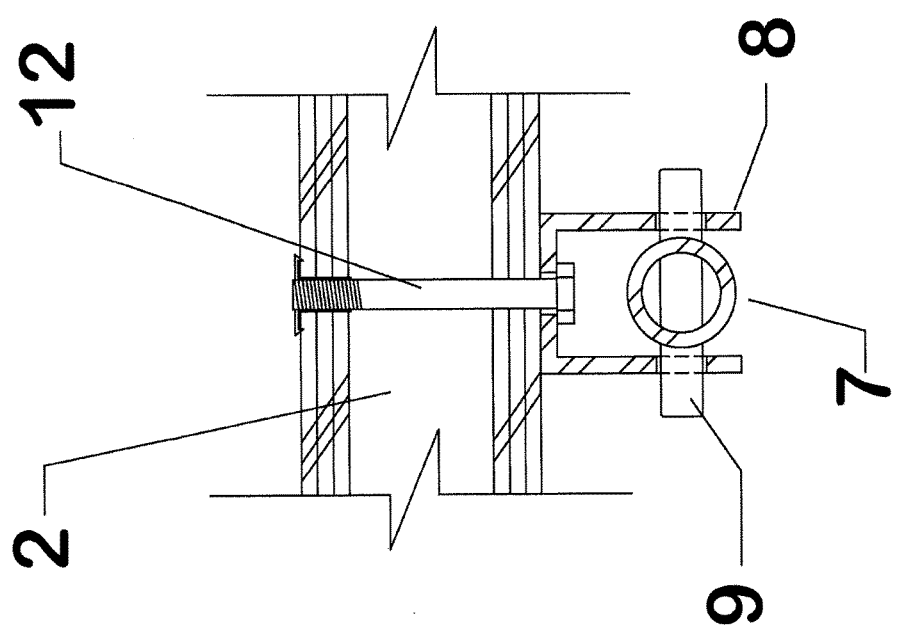

SEATING DEVICE WITH COLLAPSIBLE ARMS

CROSS-REFERENCE TO RELATED APPLICATIONS

This application claims benefit of U.S. Provisional Application 61/898,702 filed Nov. 1, 2013, which is incorporated herein by reference.

FIELD

The present invention relates to seating apparatuses and, in particular though non-limiting embodiments, to seating devices with collapsible arms and methods of utilizing a seating device with collapsible arms.

BACKGROUND

Healthcare seating has been developed over the years to assist patients and infirm or mobility-challenged users in entering and egressing a seating unit while providing adequate comfort and appropriate support of a user's body. Generally, seating products are also developed to allow easy and dependable assistance from caregivers or other attendants addressing the user's immediate needs. Typically seating products may be designed such that a user may be easily assisted and transported in and out of one healthcare seating product to another seating product, wheelchair or bed product.

Transporting a user from one product to another is typically implemented by moving the user horizontally from one product to the other without requiring the patient to rise to a standing or partially standing position. This allows the user to avoid exerting himself/herself in an effort to stand up from a chair, sit down into a chair or walking, which could cause excessive fatigue or re-injury and ultimately affect the user's safety. However, in attempting to move the user horizontally into or out of a seating product, an armrest must be removed or repositioned so that the armrest does not obstruct the user's intended path of movement.

SUMMARY

In an exemplary embodiment of the present invention, a seating device is provided having: a seat cushion; a seat back; and at least one arm having an arm proper and an armrest attached to the arm proper. The armrest has an erect position and a collapsed position relative to the arm proper. The armrest is configured to rotate relative to the arm proper between the erect position and the collapsed position.

The seating device may have two arms each having an arm proper and an armrest attached to the arm proper. The armrest may have an armcap secured to an armcap rail; at least two support posts attached at first ends of the armcap rail; and at least two brackets connected to second ends of the at least two support posts. The at least two support posts may be connected to the at least two brackets such that the at least two support posts can rotate relative to the at least two brackets. Each of the at least two brackets may have an upper slot and a lower slot. The upper slot may have an open upper end and wherein the lower slot may be closed.

The seating device may include a lower pin and an upper pin extending from the second ends of each of the at least two support posts and arranged such that the lower pin passes through the lower slot and the upper pin engages the upper slot via the open upper end. The armrest may be configured to be in the erect position when the upper pins of the at least two support posts are within the upper slot and resting upon a lower end of the upper slot.

The lower slot may have a length slightly larger than a length between the lower end and open upper end of the upper slot. An arrangement of the upper pins and the lower pins may be such that, when the at least two support posts are raised, the upper pins may pass freely out of the upper slots. The at least two support posts may be configured to rotate relative to the arm proper along an axis formed by the lower pins. The upper slot and the lower slot may be tapered. Diameters of the upper pin and the lower pin may be substantially similar to widths of the upper slot and the lower slot.

In an exemplary embodiment of the present invention, a method of transferring a user into or out of a seating device is provided, including: collapsing an armrest of the seating device; transferring the user into or out of the seating device; and erecting the armrest. The seating device has a seat cushion; a seat back; and at least one arm having an arm proper and an armrest attached to the arm proper. The armrest has an erect position and a collapsed position relative to the arm proper. The armrest is configured to rotate relative to the arm proper between the erect position and the collapsed position. The armrest may be collapsed by the steps of lifting the armrest until it may rotate relative to the arm proper; and rotating the arm proper into the collapsed position.

DESCRIPTION OF DRAWINGS

FIG. 7 is a top cross-section view of an arm proper, bracket, support post, pins, and fastener according to an exemplary embodiment of the present invention.

DETAILED DESCRIPTION

Figure 1:
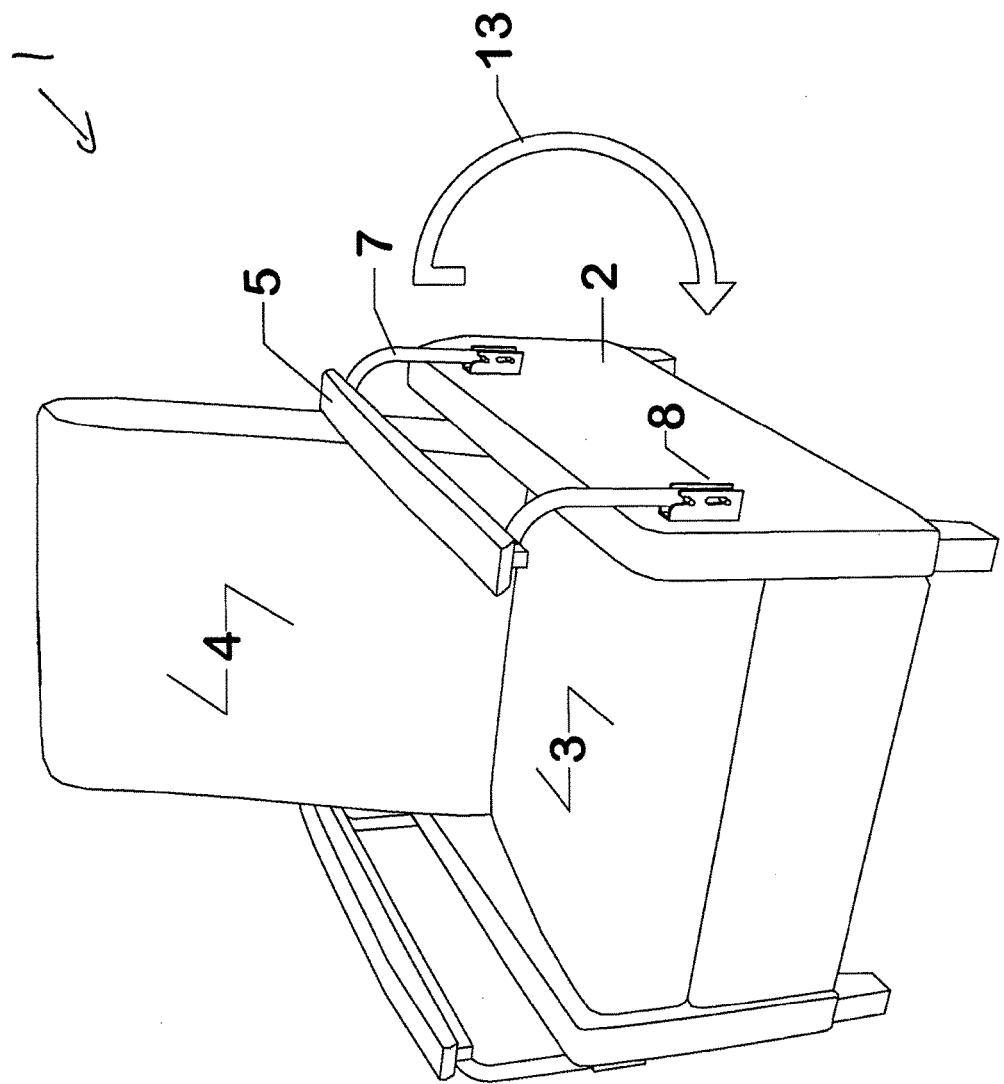
FIG. 1 is an isometric view of a seating device according to an exemplary embodiment of the present invention.
Figure 2:
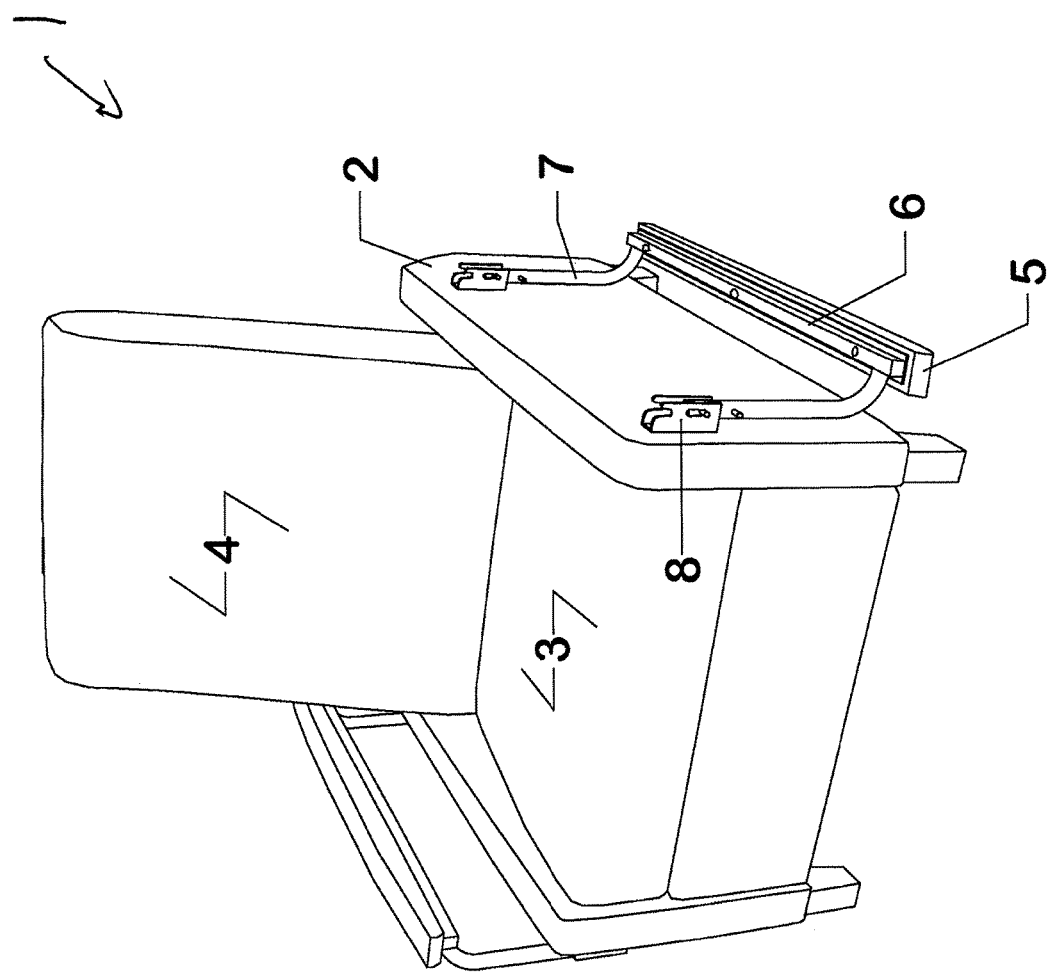
FIG. 2 is an isometric view of the seating device shown in FIG. 1 having an armrest in a collapsed position.
Figure 3:
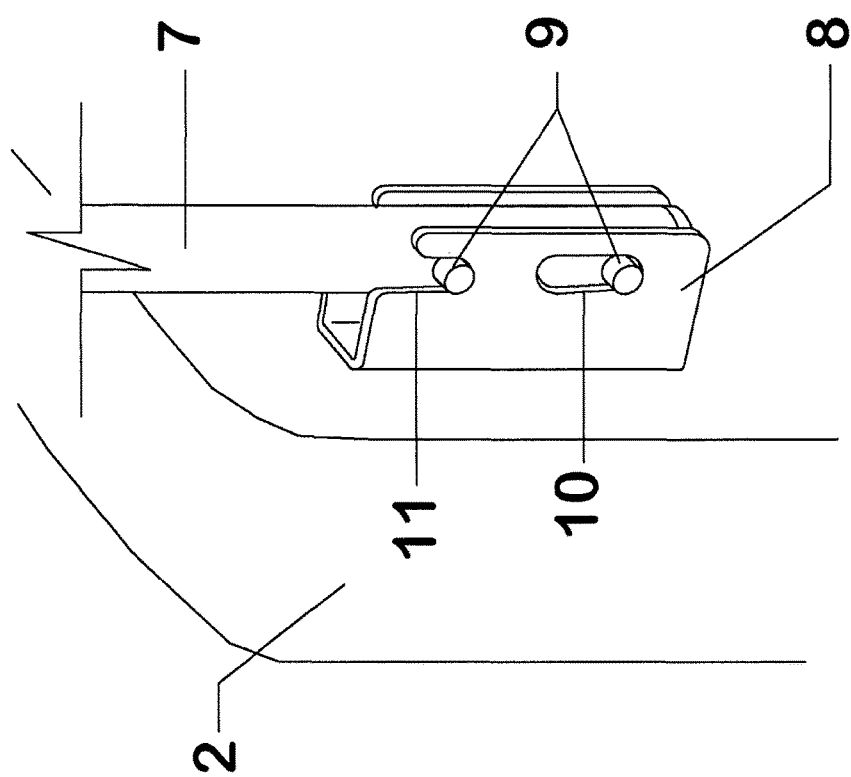
FIG. 3 is an isometric view of a bracket attached to an arm proper of the seating device shown FIG. 1.
Figure 4:
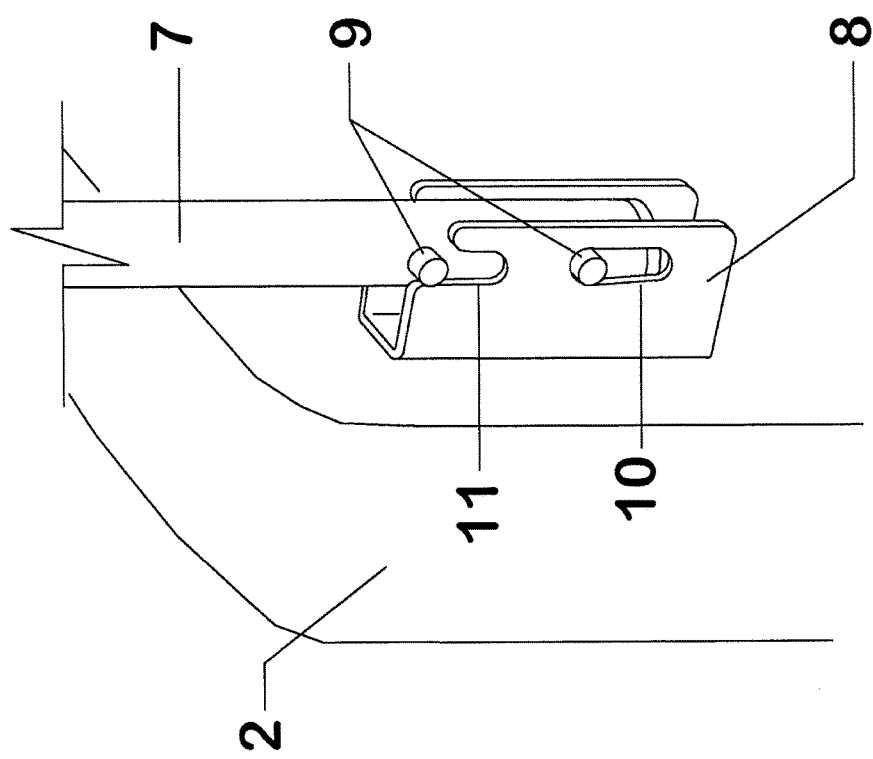
FIG. 4 is an isometric view of the bracket shown in FIG. 3 having a support post raised.
Figure 5:
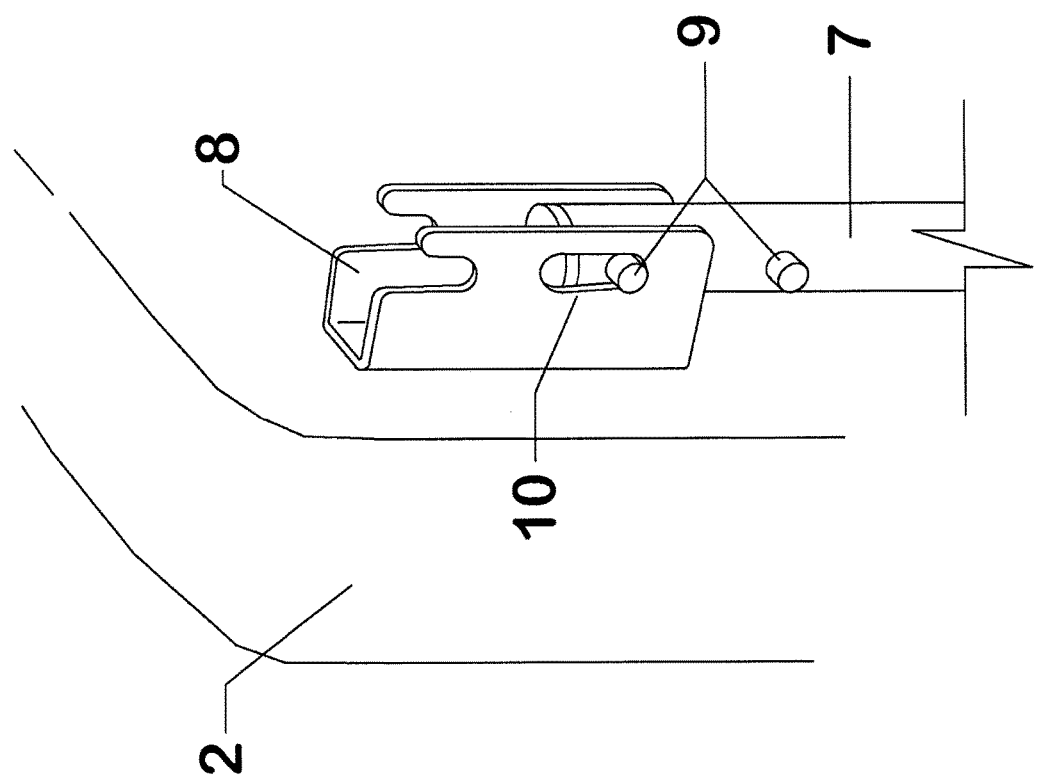
FIG. 5 is an isometric of the bracket shown in FIG. 4 wherein the support post is collapsed.
Figure 6:
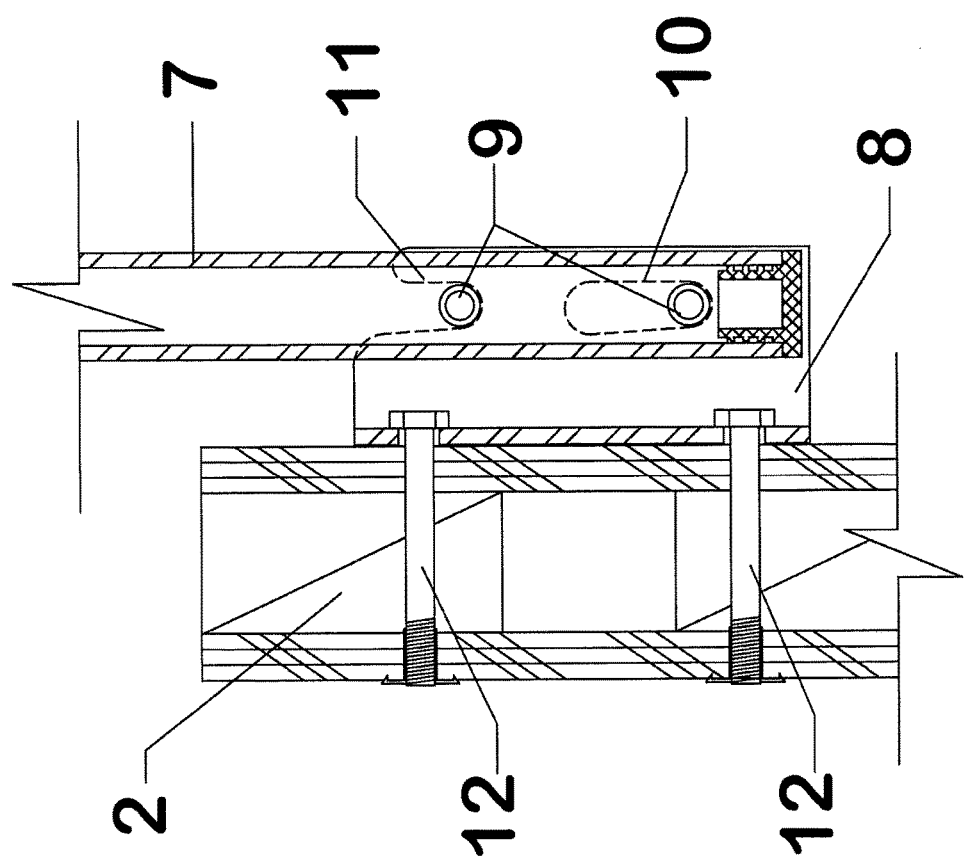
FIG. 6 is a side cross-section view of an arm proper, bracket, support post, and fasteners according to an exemplary embodiment of the present invention.

Like reference characters denote like parts in the several drawings.

Example embodiments of the present invention provide a seat having collapsible arm mechanisms attached to sides of the seat. Embodiments of the present invention include collapsible arm mechanisms permitting either arm to be quickly and efficiently collapsed to permit a user to be transferred into or out of the seat without having to rise above the armrests. Embodiments of the present invention provide arm mechanisms that securely hold an armrest in an erected position. Embodiments of the present invention provide arms that can be removed from the field of travel of a user being transferred into or out of a seat while keeping the armrests attached to the seat and minimizing the risk of unsanitary surfaces. Embodiments of the present invention provide methods of transferring a user into and/or out of a seating device having collapsible arm mechanisms wherein the arms are collapsed during transport and erected when the seating device is in use.

Embodiments of the present invention provide improvements over existing seats and methods which generally involve removing the armrest from the seat, repositioning the armrest around the exterior of the arm proper of the seat, or repositioning the armrest inside of the arm proper of the seat.

Solutions that incorporate removal of the armrest create susceptibility of the armrest being lost or misplaced from the seating product, thereby, reducing its availability for future users desiring an armrest. Removing the armrest with temporary placement of away from the seating product can also cause a tripping and falling hazard for caregivers or others in the immediate vicinity of the seating product. Also, removable armrests typically incorporate a peg system where structural pegs are inserted into holes of the arm proper to secure the armrest to the arm. Cavities or holes that are required for the pegs can fill with dirt, grime, bacteria and/or other pathogens and thus become an infection control and cleanliness concern for the caregiver. Further, a fabric's surface area between the armrest and the arm proper is an additional semi-concealed area that typical wiping and cleaning could miss and again cause an infection control and cleanliness problem.

Repositioning the armrest around the exterior of the arm proper of a seat is a prevailing solution. However, current designs yield weaknesses to a patient, a caregiver and the product itself. Identified armrests that incorporate this design have been noted as having solid and panel-type armrests with rigid axis pivot points through hinged connectors. This allows for the collapsible arm to have a more discreet appearance within the overall product. These designs are problematic, though, in that, if both armrests are able to be collapsible, one of the collapsed armrests will conceal the controls to operate a seating product's footrest, back recline mechanism or other features. Other strategies note this deficiency and only allow for one armrest to be allowed to collapse. However, with the potential of every other room or station being the mirrored layout of the one next to it, the armrest is not beneficial in that the single collapsible armrest may be on the wrong side of the seating product to be of any use in transferring a user to another product.

The solid panel armrests also require a substantial amount of additional cleaning and sterilization due to their additional surface area. As with a removeable armrest, some of this surface area is semi-concealed and is exposed to being inadvertently missed during the cleaning process.

Use of fixed-axis hinge mechanisms is required to have a locking clasp so that the armrests remain in the upright position when needed. A weakness with this strategy is that the armrest is susceptible to lateral forces should a foreign element be pushed into the seating product or the product be pushed into the foreign element. Lateral forces could have the potential to bend or twist the fixed axis hinges, which could prohibit the armrest from seating itself correctly in an upright position and allowing the locking clasp to engage. The locking clasp is very important to the user's safety as the armrests are commonly used to support a user's weight when entering or egressing the product. If the locking clasp does not engage, the armrest could violently collapse and cause the user to fall and injure himself/herself. The locking clasp is typically located within the hinged or pivoting planes between the armrest and the arm proper and is activated by a cable routed through the inside of the panel armrest to a discreetly located activator. The concealed locations of this part of the mechanism prevents visual confirmation as to whether the locking clasp has successfully engaged and a failed engagement would only be evident to the user after loading and accidental collapse of the armrest occurred.

Some design strategies attempt to collapse the armrest into an interior cavity of an arm proper. The armrests depend on being supported by large posts or columns. To collapse the armrest into the arm proper, a large cavity must be available. Such a cavity is a major infection control and cleanliness problem due to the ability of foreign and infectious elements to fall inside the cavity and difficulty in cleaning out the inside cavity of the arm proper. Also, the armrest may become defective due to its components or connections inside the arm proper, requiring the arm proper to be removed from the seating product and opened up to access the necessary components and fittings.

To overcome these limitations, the present invention provides a seating product having collapsible arms, which remain attached to the seat, are easily collapsible, and are substantially secure when erected. Embodiments of the present invention incorporate two pivoting mechanisms permanently attached to a surface of each arm proper, thereby avoiding lost or misplaced components or tripping hazards for individuals in close proximity to the seating product. Embodiments of the present invention eliminate cavities or holes in the arm proper component and, thereby, avoid areas that can be inhabited by dirt, grime, bacteria or other pathogens, which are difficult to access and clean or disinfect. Embodiments of the present invention provide armrests consisting of only essential structural parts without panels, thereby, reducing surface areas to be cleaned and sterilized. Also, with the exposed structure and the minimal amount of material used, no concealed areas are present that could be easily and inadvertently overlooked when the product is cleaned or disinfected.

Embodiments of the present invention can be activated and operated through various positions without concealing or causing an obstruction to a user or caregiver, allowing the user or caregiver to activate and control other product seating features and controls. In embodiments of the present invention, both armrests are collapsible and, therefore, are useful regardless of room layout or other furniture locations.

Embodiments of the present invention provide hinge mechanisms designed so that an axis of pivot or hinging action floats to avoid damaging forces or stresses, which could otherwise bind the armrest and cause it to buckle or rack and not operate or seat properly in an upright position or not allow a locking clasp (as is used in the majority of existing designs) to engage fully.

In embodiments of the present invention, the entirety of the arm mechanism may be surface mounted onto an arm proper, thereby, avoiding difficult and expensive repairs that are necessary for existing designs to replace or repair parts of armrests that are deemed faulty and are located within a panel construction of an arm proper.

Although the present collapsible apparatus will be described hereinafter in connection with the support of an collapsible arm rest, it will be apparent that the apparatus can also be used to support other elements in seating and furniture applications, such as collapsible side tables, trays, foot rests, head pillows, push bars or the like, and such other applications are contemplated as within the scope of the present invention.

Referring to FIGS. 1 to 7, in an embodiment of the present invention, a seating product 1 is provided having a seat cushion 3, seat back 4, and at least one arm having an arm proper 2 with a collapsible armrest mechanism attached to arm proper 2 via fasteners 12, which may be bolt fasteners. See, e.g., FIGS. 6 and 7. The collapsible armrest mechanism has an armcap 5 secured to armcap rail 6. Armcap rail 6 is connected to at least two structural pipe support posts 7 that join to channel support brackets 8 via pins 9. Pins 9 allow the armrest to seat in side slots 10 and 11 cut into the channel support brackets 8 and also allow the pipe support posts 7 to pivot in the intended direction of collapse 13.

As shown, two slots are cut into channel support brackets 8: an open end slot 11 and a closed end slot 10. Both slots may be formed to have a width slightly larger than a diameter of pins 9. Both slots are flared along their vertical sides to prohibit the pin from rubbing or catching on the sides. Closed end slot 10 is provided to allow the armrest to pivot through its movement of collapse. The open end slot 11 is provided to allow a pin to enter and exit through an open end of slot 11, creating a contained and uncontained presence for the upper pin thus creating a seated and secure presence, as well as, a released presence to allow the lower pin to pivot inside of slot 10.

FIG. 1 provides a perspective view of an embodiment of the present invention wherein the arms are in an erected position and pins 9 are engaged with slots 10 and 11. In this position, pins 9 rest on a bottom portion of slots 10 and 11. See, e.g., FIG. 3. A diameter of pins 9 is substantially similar to a width of slots 10 and 11 such that pins 9 to not permit substantial lateral movement when engaged in slots 10 and 11. To collapse the arms, posts 7 may be raised until upper pin 9 passes freely out of an open top end of slot 11. See, e.g., FIG. 4. Once upper pin 9 is clear of slot 11, post 7 may be rotated along an axis formed by lower pin 9 within slot 10 and in the direction of arrow 13. See, e.g., FIG. 1. Rotation may continue and post 7 allowed to drop until the armrest hangs down from channel support brackets 8. See, e.g., FIGS. 2 and 5. To erect the armrest, the armrest may be rotated opposite of arrow 13, lifted up such that upper pin 9 may pass over and into slot 11, and posts 7 allowed to drop until pins 9 rest upon bottom portions of slots 10 and 11.

With the use of two pipe support posts 7 and their respective pins 9 and channel brackets 8 for each armrest, the armrest apparatus is allowed to easily float inside the slots while retaining a balanced, rigid and fully connected armrest.

In embodiments of the present invention a method of transferring a user into and/or out of a seating device is provided. The method may include collapsing an armrest of a seating device as disclosed herein, transferring the user into or out of the seating device and erecting the armrest. Embodiments of the present invention include methods of transferring users from either side of the seating device.

The foregoing embodiments are presented by way of example only. While the embodiments are described herein with reference to various implementations and exploitations, it will be understood that these embodiments are illustrative and that the scope of the invention(s) is not limited to them. Many variations, modifications, additions, and improvements are possible and the various aspects of the different embodiments described herein may be incorporated into each of the different exemplary embodiments described as appropriate to accomplish to tasks specified herein.

For example, plural instances may be provided for components, operations or structures described herein as a single instance. Boundaries between various components, operations and functionality are depicted somewhat arbitrarily, and particular operations are illustrated within the context of specific illustrative configurations. Other allocations of functionality will also fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A seating device, comprising:
   a seat cushion;
   a seat back;
   a first arm having a first arm proper and a first armrest attached to the first arm proper;
   wherein the first armrest has a first erect position and a first collapsed position relative to the first arm proper,
   wherein the first armrest is configured to rotate relative to the first arm proper between the first erect position and the first collapsed position, and
   wherein the first armrest comprises:
      an armcap secured to an armcap rail;
      at least two first support posts each having a first end and a second end, the first end of each of the at least two first support posts attached to the armcap rail; and
      at least two first brackets respectively connected to the second end of each of the at least two first support posts,
      the at least two first support posts respectively connected to the at least two first brackets, a first support post of the at least two first support posts arranged to rotate relative to a first bracket of the at least two first brackets,
   wherein each of the at least two first brackets comprises:
      an upper slot having an open upper end; and
      a lower slot that is closed.

2. The seating device of claim 1, further comprising a second arm having a second arm proper and a second armrest attached to the second arm proper
   wherein the second armrest has a second erect position and a second collapsed position relative to the second arm proper, and
   wherein the second armrest is configured to rotate relative to the second arm proper between the second erect position and the second collapsed position.

3. The seating device of claim 2, wherein the second armrest comprises:
   a second armcap secured to a second armcap rail;
   at least two second support posts each having a first end and a second end, the first end of each of the at least two second support posts attached to the second armcap rail; and
   at least two second brackets respectively connected to the second end of each of the at least two second support posts,
   the at least two second support posts respectively connected to the at least two brackets, a first support post of the at least two second support posts arranged to rotate relative to a first bracket of the at least two second brackets.

4. The seating device of claim 1, further comprising a lower pin and an upper pin extending from the second end of each of the at least two first support posts and arranged such that the lower pin passes through the lower slot and the upper pin engages the upper slot via the open upper end.

5. The seating device of claim 4, wherein the first armrest is configured to be in the first erect position when the upper pins of the at least two support posts are within the upper slot and resting upon a lower end of the upper slot.

6. The seating device of claim 5, wherein the lower slot has a length larger than a length between the lower end and the open upper end of the upper slot.

7. The seating device of claim 6, wherein the arrangement of the upper pins and the lower pins is such that, when the at least two support posts are raised, the upper pins may pass freely out of the upper slots.

8. The seating device of claim 7, wherein the at least two first support posts are configured to rotate relative to the first arm proper along an axis formed by the lower pins.

9. The seating device of claim 1, wherein the upper slot and the lower slot are tapered.

10. The seating device of claim 4, wherein diameters of the upper pin and the lower pin are substantially similar to widths of the upper slot and the lower slot.

11. A method comprising:
collapsing an armrest of a seating device into a first position;
transferring the user into the seating device; and
erecting the armrest into a second position,
wherein the seating device comprises
an arm having an arm proper attached to the armrest,
wherein the second position and the first position are each relative to the arm proper,
wherein the armrest is configured to rotate relative to the arm proper between the second position and the first position
wherein the armrest comprises:
an armcap secured to an armcap rail;
at least two support posts each having a first end and a second end, the first end of each of the at least two support posts attached to the armcap rail; and
at least two brackets connected to the second end of each of the at least two support posts,
the at least two support posts connected to the at least two brackets to rotate relative to the at least two brackets,
the at least two brackets comprise:
an upper slot; and
a lower slot,
wherein the upper slot has an open upper end and wherein the lower slot is closed.

12. The method of claim 11, wherein the collapsing the armrest comprises
lifting the armrest until the armrest rotates relative to the arm proper; and
rotating the arm proper into the collapsed position.

13. The method of claim 11, further comprising transferring the user out of the seating device.

* * * * *